United States Patent [19]

Gurewitz

[11] 3,951,256
[45] Apr. 20, 1976

[54] POWER BELT TURN CONVEYOR

[76] Inventor: Samuel J. Gurewitz, 75-23 190th St., Flushing, N.Y. 11366

[22] Filed: Dec. 27, 1971

[21] Appl. No.: 212,305

Related U.S. Application Data

[63] Continuation-in-part of Ser. No. 122,968, March 10, 1971, abandoned.

[52] U.S. Cl. .............................. 198/182; 198/181
[51] Int. Cl.² ....................................... B65G 15/00
[58] Field of Search ............ 198/181, 182; 193/35 R

[56] References Cited
UNITED STATES PATENTS

| | | | |
|---|---|---|---|
| 2,457,407 | 12/1948 | Sebastian | 198/184 |
| 3,217,861 | 11/1965 | Daniluk et al. | 198/182 |

FOREIGN PATENTS OR APPLICATIONS

| | | | |
|---|---|---|---|
| 228,729 | 10/1958 | Australia | 198/182 |
| 1,056,890 | 2/1967 | United Kingdom | 198/182 |
| 1,222,430 | 2/1964 | Germany | 193/35 R |

Primary Examiner—Evon C. Blunk
Assistant Examiner—Joseph E. Valenza
Attorney, Agent, or Firm—Holland, Armstrong, Wilkie & Previto

[57] ABSTRACT

A curved conveyor is disclosed for carrying articles including relatively heavy articles around curves in a conveyor belt system. The conveyor includes an endless curved driven belt with a guide means for holding the belt on its curved path during operation. This guide means includes a series of guide rollers attached to the inner surface of the belt and which engage cooperating curved guides in a conveyor bed. The conveyor bed is formed of identical cast sections which are fastened together in the proper quantity to provide the particular amount of curvature required.

3 Claims, 13 Drawing Figures

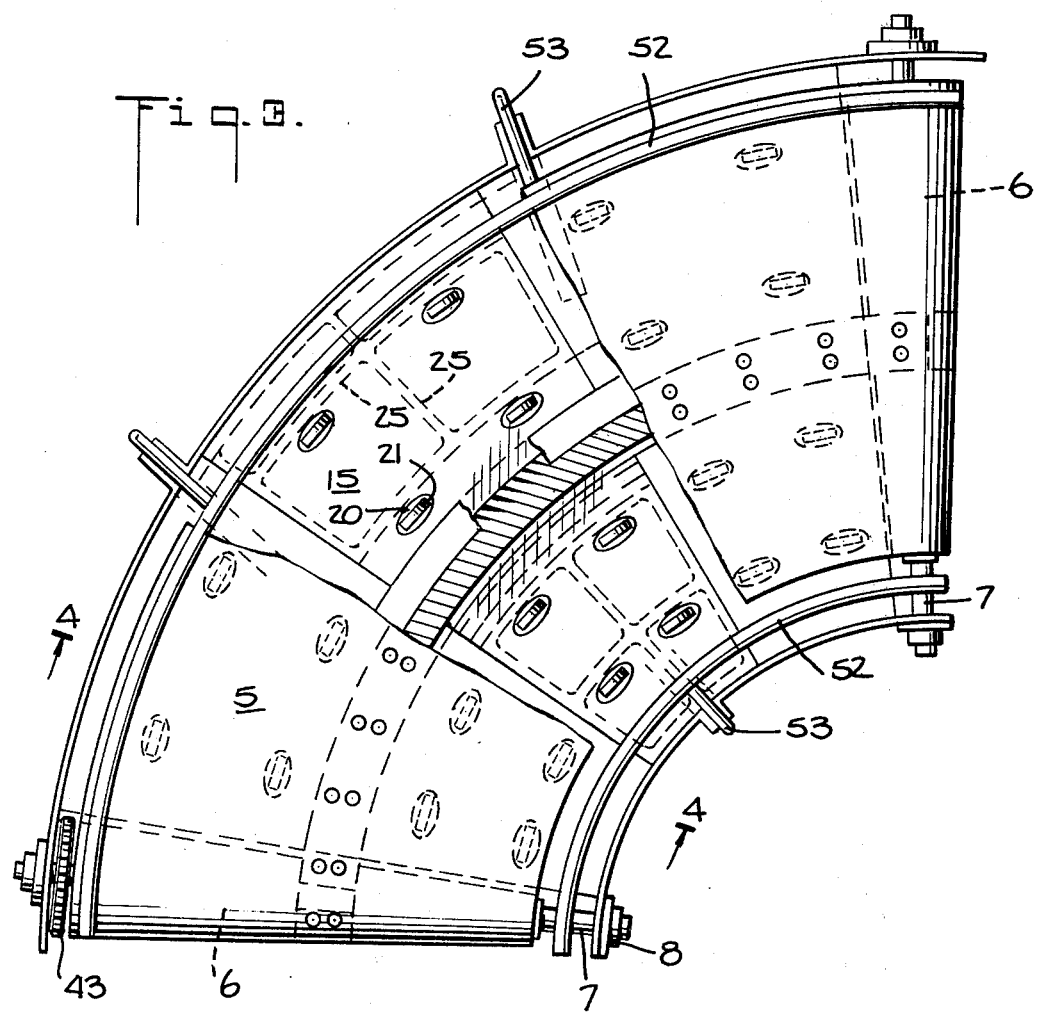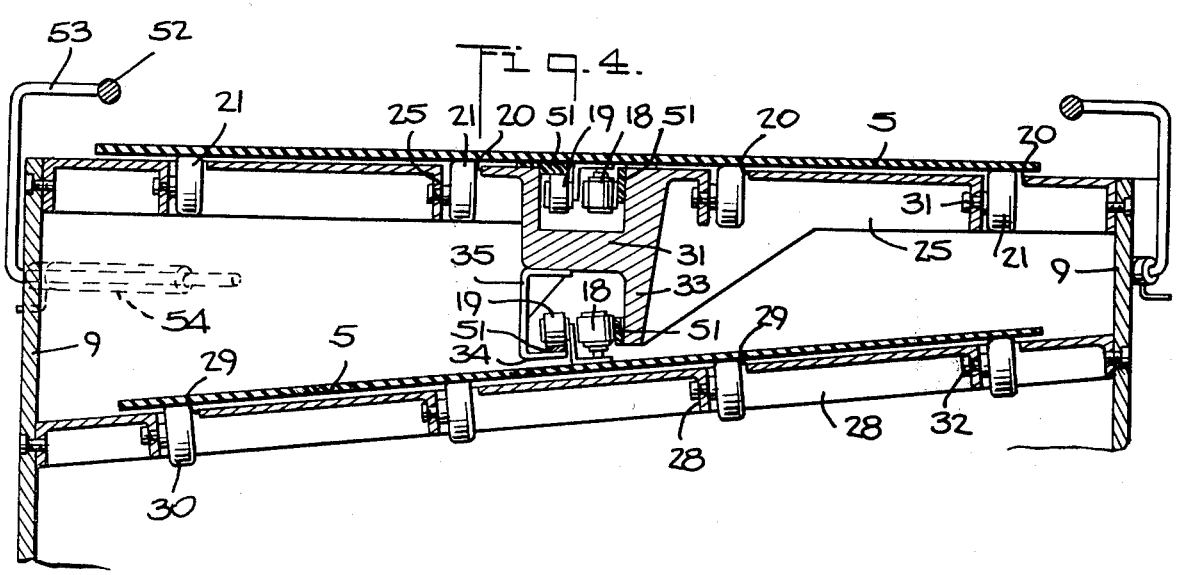

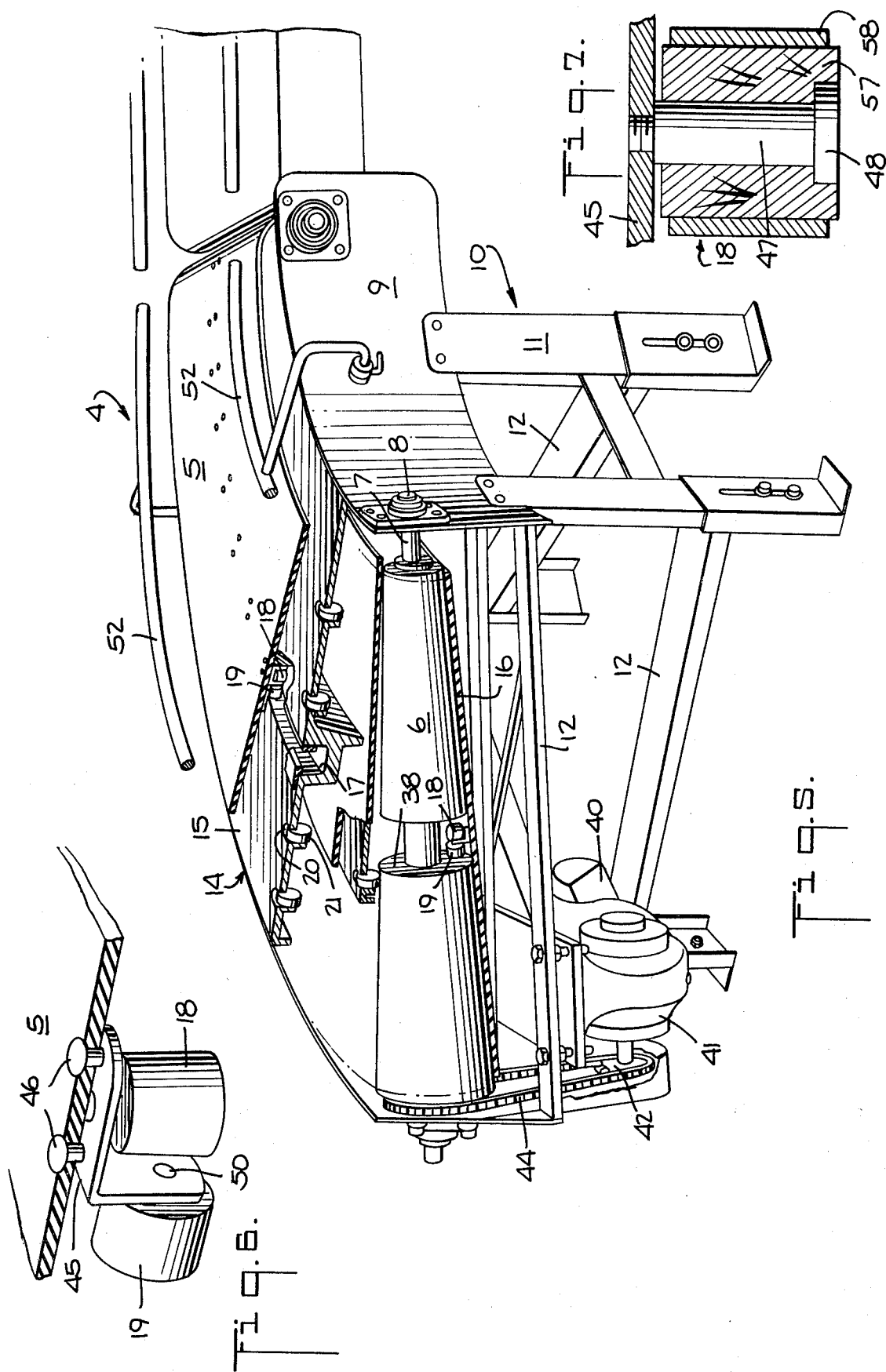

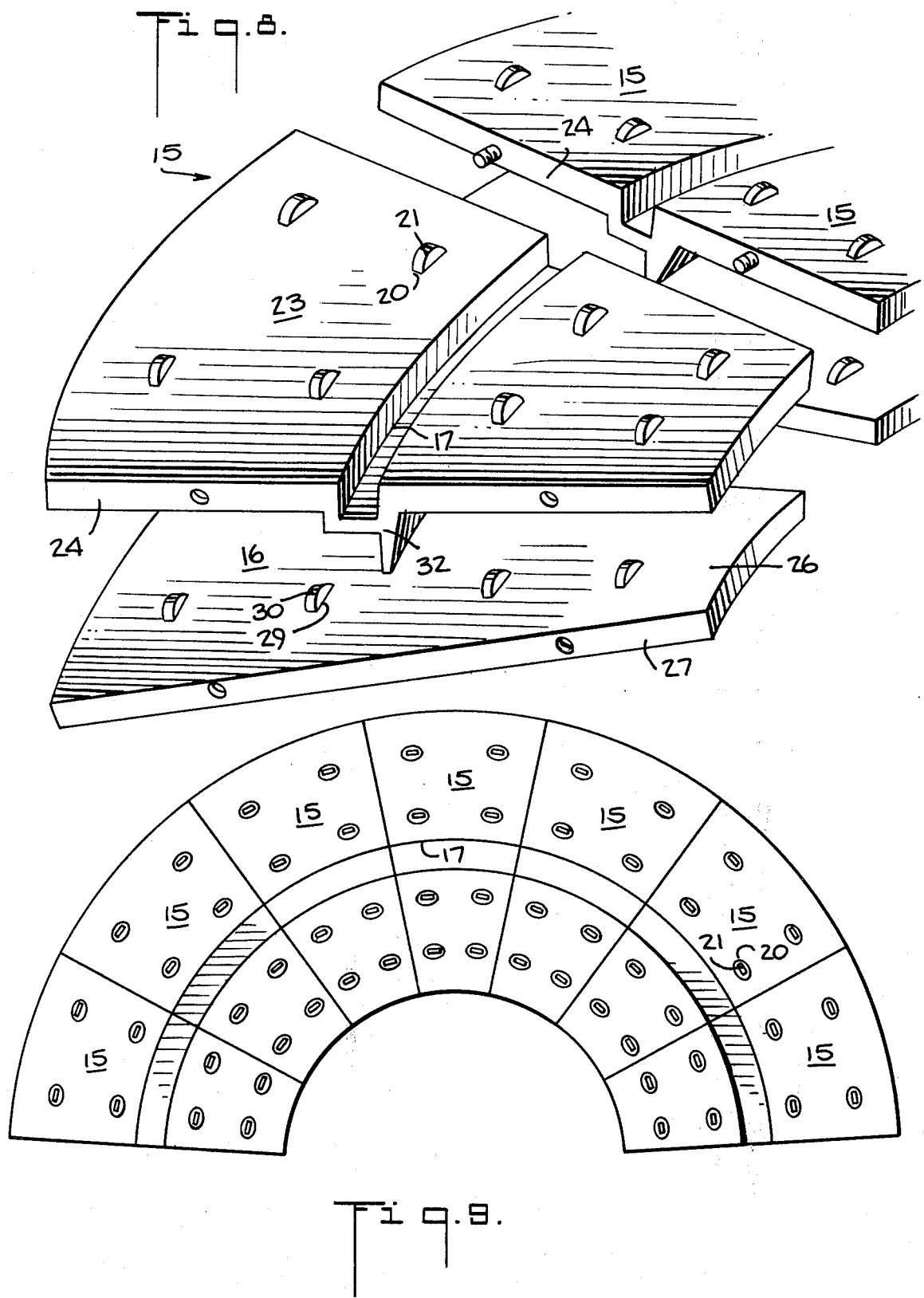

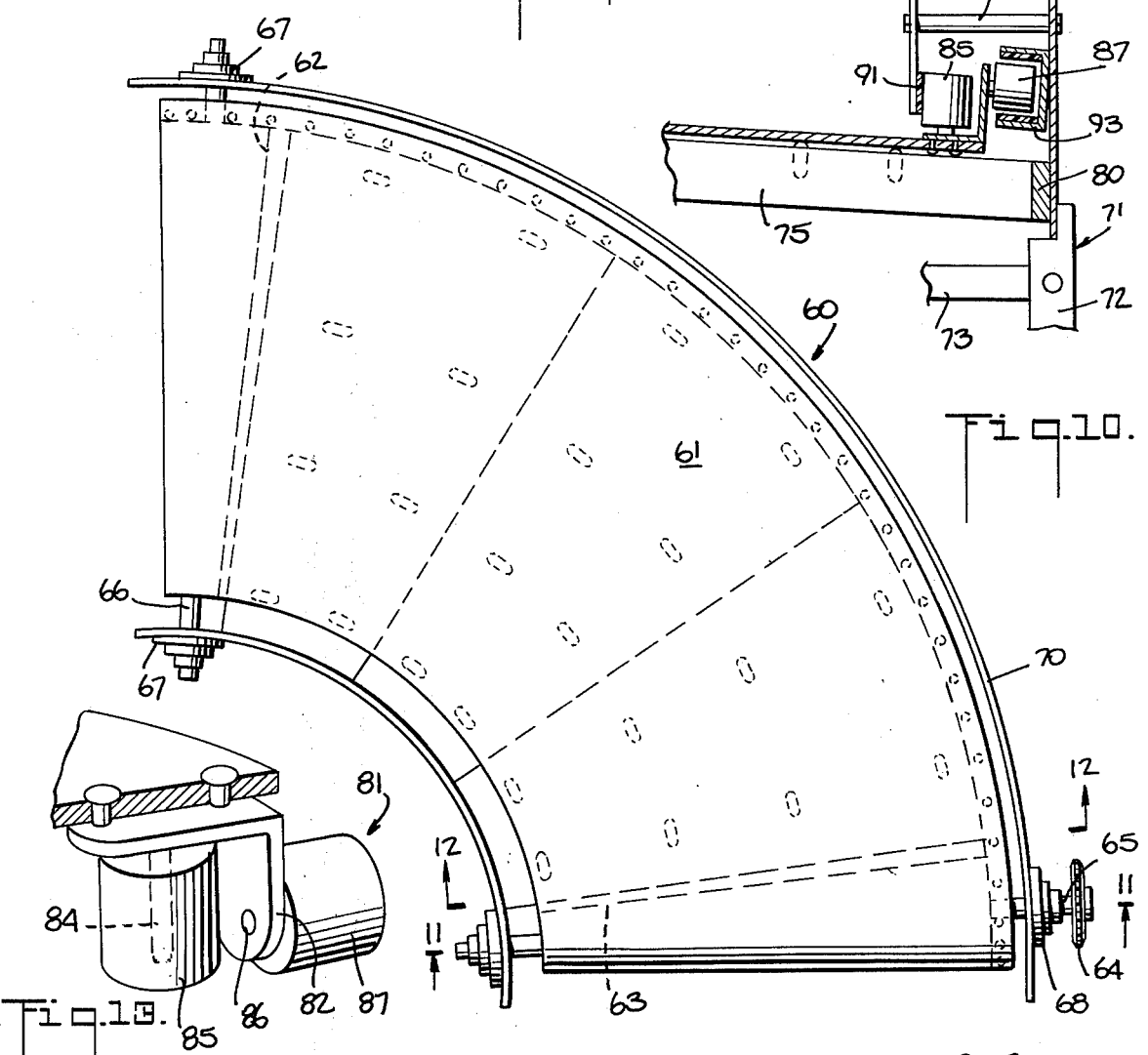

POWER BELT TURN CONVEYOR

This application is a continuation-in-part of my co-pending U.S. application Ser. No. 122,968 filed Mar. 10, 1971 now abandoned.

BACKGROUND OF THE INVENTION

The present invention relates to power conveyors of the type used to transport articles in manufacturing, warehousing, retailing, or similar operations. More particularly, the invention relates to an improved curved conveyor section for insertion in a conveyor system to carry the conveyed articles around a curve.

A variety of conveyor systems are now in use for transporting various packages or crates or other articles from one point to another in manufacturing and other distribution operations. Such conveyor systems include straight portions as well as article raising and lowering sections and they also include curves or corners where the conveyor systems change direction. Where the conveyed material is relatively heavy as, for example, packed cartons such as bottle cartons or can cartons or other heavy articles, it is necessary for the curved portions of the conveyors to be powered so that the overall conveyor system speed may be kept high. Presently known curved or power turn conveyors utilize various systems for keeping the curved conveyor belt in position around the curved path. Some present systems include guide chains mounted on one or both sides of the conveyor belt and others have rollers mounted on the stationary conveyor framework. These guide devices are relatively complicated and have also been found to wear rapidly requiring frequent adjustment or part replacement.

The conveyor belt, in accordance with the present invention, utilizes a guide system comprising a series of rollers attached directly to the inside or underside of the belt which are adapted to ride in guide channels on the conveyor support frame. Additionally, a simplified and standardized belt support frame or bed is provided in the form of standardized sections permitting the curvature of the belt path to be adjusted by the use of a pre-selected number of the sections.

Accordingly, an object of the present invention is to provide an improved power turn belt conveyor.

Another object of the present invention is to provide a power turn belt conveyor with an improved belt guide system.

Another object of the present invention is to provide a power turn belt conveyor with an improved and simplified support frame or bed including standardized sections for facilitating flexibility of belt design and assembly.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification wherein;

FIG. 3 is a top plan view partially in section illustrating the conveyor.

FIG. 4 is a vertical sectional view of the conveyor taken along line 4—4 on FIG. 3.

FIG. 5 is a perspective view partially cut away of the turn conveyor.

FIG. 6 is an enlarged perspective view of the guide rollers for the turn conveyor as attached to the conveyor belt.

FIG. 7 is a vertical sectional view through a guide roller.

FIG. 8 is a perspective view illustrating the standardized support plates for the turn conveyor bed.

FIG. 9 is a diagrammatic plan view illustrating a number of support plates coupled together to provide a turn path approximately a 180° turn.

FIG. 10 is a top plan view of another embodiment of the turn belt conveyor.

FIGS. 11 and 12 are vertical sectional views of the conveyor taken along lines 11—11 and 12—12 on FIG. 10.

FIG. 13 is a detailed perspective view of a guide roller assembly.

DESCRIPTION OF THE PREFERRED EMBODIMENT

Figure 1:
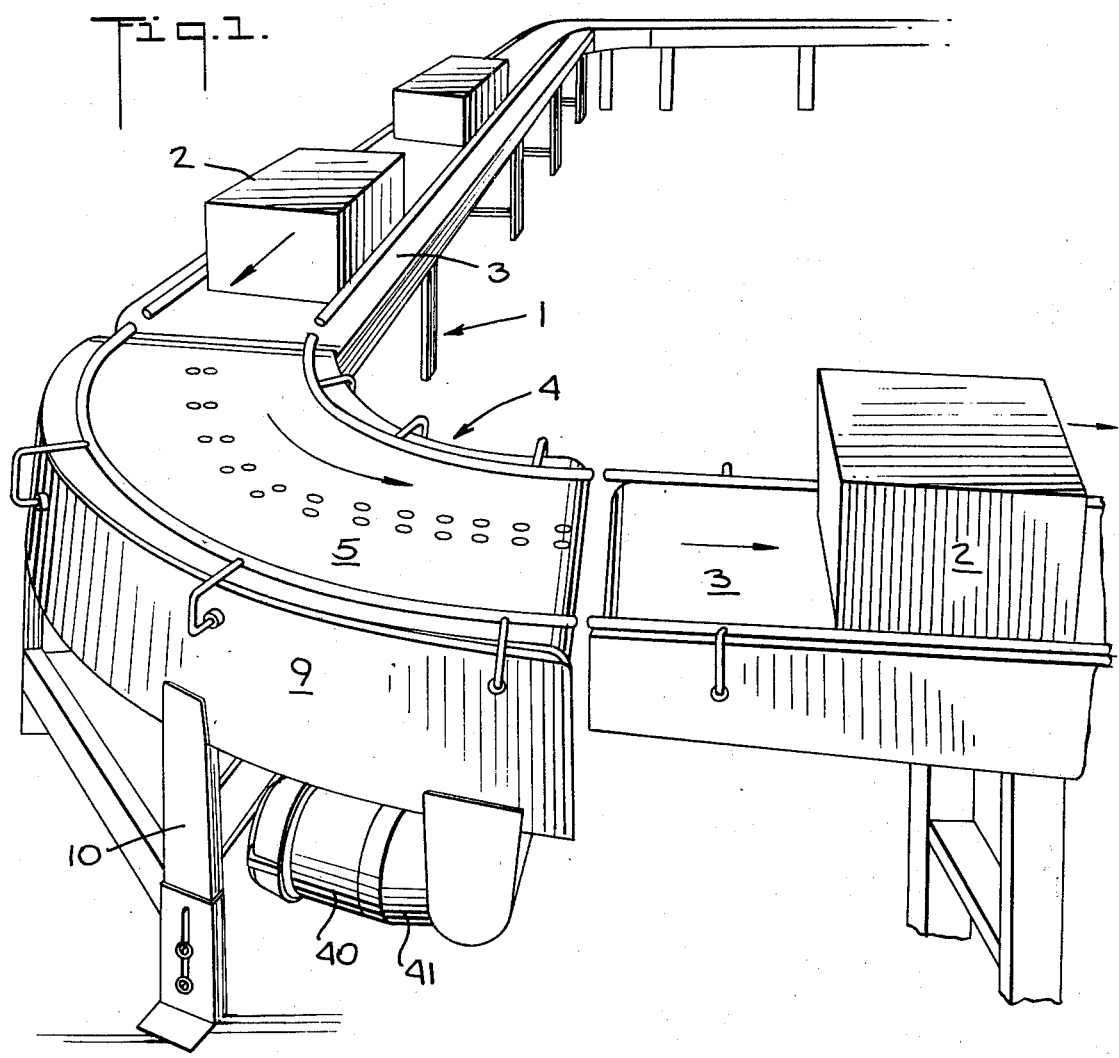
FIG. 1 is a perspective view illustrating a preferred embodiment of the power turn belt conveyor in position in a typical system.

FIG. 1 illustrates a typical conveyor system 1 for handling cartons or other articles 2 in a warehousing or retailing or other operation. The conveyor system 1 is seen to include two straight runs 3 connected by a curved section comprising a turn conveyor 4 in accordance with the present invention. The articles 2 being moved by the conveyor system 1 may comprise grocery cartons or bottle cartons or other articles ranging in weight from relatively light articles to articles weighing hundreds of pounds. In such a conveyor system, efficient operation of the overall system requires the turn conveyor 4 itself to be powered to insure an efficient handling of each article 2 as it is carried from one straight section to the other.

One embodiment of a turn conveyor 4 will now be described generally with reference to FIGS. 2 through 5.

The turn conveyor 4 includes an endless conveyor belt 5 which preferably is cut from a single piece of belt material with the proper arcuate shape so that it may be looped and fastened to form a single and endless curved belt of the form illustrated in FIGS. 3 and 5. A preferred material for such an endless and curved belt comprises fabric reinforced rubber or rubber-like plastic. The belt 5 is mounted on spaced and angularly aligned end pulleys or rollers 6 having mounting axles 7 rotatably contained in spaced end bearings 8 or side panels 9. A support frame 10 is provided which includes vertical adjustable legs 11 and lateral supports 12. A bed 14 is provided for the conveyor belt 5 formed of several plates or sections 15 and 16 which simultaneously provide the necessary structural support and stiffening for the conveyor 1 as well as providing a mounting for the belt 5 supporting rollers 6 and the guide groove 17 for the conveyor belt 5 guide rollers 18 and 19.

In the preferred embodiment of the conveyor 1, the bed sections are formed with an identical design for each of the several top sections 15 and with a different identical design for each of the bottom sections 16.

These sections 15 and 16 are preferably made from cast metal having the various portions including apertures 20 for the belt support rollers 21 and the guide grooves 17 for the belt guide rollers 18 and 19 provided as the sections 15 and 16 are cast.

FIG. 8 is a perspective view showing the preferred form of the top and bottom sections 15 and 16 and additional details are illustrated in the sectional view of FIG. 4. The sections 15 are seen to include wedge-shaped support surfaces 23 having depending coupling flanges 24 provided at their edges and including a number of intermediate strengthening and roller supporting flanges 25 on the undersides of the sections 15 as illustrated in FIGS. 3 and 4. The lower sections 16 have generally similar faces 26, coupling flanges 27, and supporting flanges 28 (FIG. 4). Each of the top and bottom sections 15 and 16 include a series of apertures 20 and 29, respectively, formed during the molding for accommodating the conveyor belt support rollers 21 and 30. As seen in FIGS. 4 and 5, the strengthening flanges 25 and 28 adjacent to the apertures 20 and 29 include roller mountings 31 and 32 to permit the rollers 21 and 30 to be easily placed on the completed sections 15 and 16.

The upper and lower sections 15 and 16 differ by the provision of integral roller guide flanges 32 on the upper sections 15. These flanges 32 on the sections are positioned below and may include a portion of the curved and upwardly directed roller guiding grooves 17. The grooves 17 receive and guide the belt rollers 18 and 19 on the upper belt run in the manner illustrated in FIG. 4. Means are included on the flanges 32 for guiding and supporting the lower run of the conveyor belt 5 by engaging the guide rollers 18 and 19 which include a lateral guide rail 33 for engaging the lateral guide roller 18 and a support rail 34 including suitable mounting brackets 35. A completed upper conveyor belt bed is assembled by bolting sections 15 together at edge flanges 27 and a lower bed is similarly formed from sections 16. The assembled uppper bed and lower beds are attached to the side sections 9 of the conveyor frame 10. The use of premolded and standardized sections 15 and 16 including the several features described above permits turn conveyors of curvature to be readily assembled using more or less sections as may be required for a particular turn or curve.

FIG. 3, for example, shows a turn of about 90° utilizing three upper sections 15 and three lower sections 16 together with the end rollers 6. FIG. 9 illustrates a larger number of sections 15 coupled together which, with suitable end rollers, provide about an 180° turn.

Figure 2:
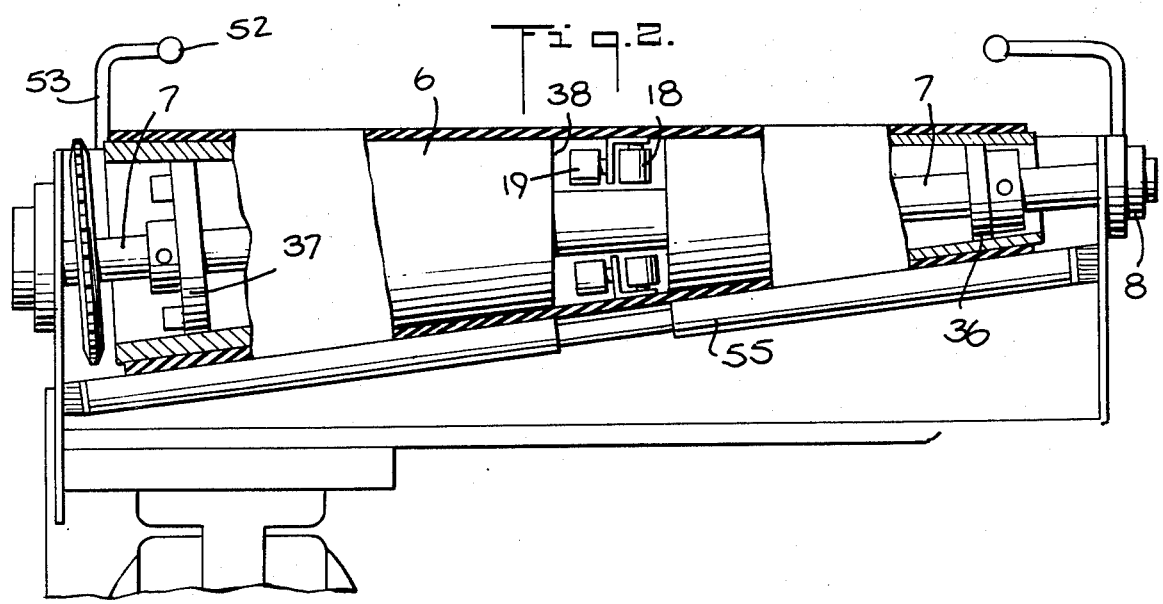
FIG. 2 is an end view partially cut away of the conveyor.

A preferred form of the end rollers 6 is illustrated in FIGS. 2 and 5. The rollers 6 are also preferably formed in a molding operation in one piece with the exception of the circular end pieces 36 and 37 which are provided with axle mounting flanges. The rollers 6, when formed, include roller clearance grooves 38 to permit the guide rollers 18 and 19 to pass around the end rollers 6 without interference. The drive power for the belt 5 comprises a suitable drive motor 40 and a stepdown gear box 41 mounted on the conveyor frame 10 and coupled to one end roller 6 through the intermediation of sprockets 42 and 43 and chain 44 (FIGS. 3 and 5).

The guide means for holding the conveyor belt 5 on its curved path includes the above described guide rollers 18 and 19 and the guiding groove 17 and rails 33 and 34. A preferred embodiment of the guide roller arrangement is illustrated in FIGS. 6 and 7. It includes a metal support bracket 45 which is attached to the belt by spaced rivets or bolts 46. The lateral guide roller 18 is rotatably mounted on a stud 47 threadedly connected to the bracket 45 which confines the roller under an end flange 48 (FIG. 7). The adjacent support roller 19 is similarly attached by horizontally aligned stud 50 threadedly connected to the adjacent leg of the support bracket 45. A preferred material for these rollers comprises an oil saturated wooden bearing 57, as illustrated, bearing directly on the mounting studs 47 and 50 and having an outer steel ring or tube 58. Such rollers have been found to provide exceptionally troublefree and long lived guiding action.

The above described upper guide channel 17 and the lower guide means 32, 33, 34 preferably have the roller engaging surfaces coated with plastic strips 51 such as teflon strips which provide a long-wearing and low-friction surface for the guide rollers 18 and 19.

Adjustable side guide rails 52 are provided which have the lower portions of their support brackets 53 adjustably mounted in hollow adjustable supports 54. Several of these supports 54 are positioned along the sides of the turn conveyor frame 10.

A supplemental smaller guide roller 55 is also provided immediately below the end rollers 6 to facilitate passage of the conveyor belt 5 from the sections 15 of the upper bed to the sections 16 of the lower bed.

Another embodiment of the power turn conveyor is illustrated at 60 in FIGS. 10 through 13. In this embodiment, the belt guiding means is attached to the outer edge of the conveyor belt 61.

FIG. 10 shows an endless conveyor belt 61 of the general type already described above, mounted between spaced end pulleys or rollers 62 and 63. End roller 63 is seen to include a drive sprocket 64 on its mounting shaft 65 for powering the roller 63 and for moving the belt 61 in the same general manner already described for the driven end roller 6 in power turn conveyor 4. The spaced end rollers 62 and 63 are mounted on shafts 65 and 66 which are supported in flange bearings 67 and 68 mounted on the curved inner and outer side walls 69 and 70 of the conveyor 60. The curved side walls 69 and 70 are mounted on a support frame 71 generally similar to that of the turn conveyor 4 including vertically adjustable legs 72 and lateral supports 73.

As best illustrated in FIGS. 10 and 12, the upper and lower runs of the conveyor belt 61 are supported by transverse bed sections including three top bed sections 74 and a corresponding number of bottom bed sections 75. These sections, although shaped differently from sections 15 and 16 described above, are also preferably one piece castings formed in the manner discussed above in connection with the bed sections 15 and 16. The sections 74 and 75 are seen to include conveyor belt support rollers 76 mounted on axles 77 in apertures 78 formed in the bed sections 74 and 75. The sections 74 and 75 function both to support the upper and lower runs of the conveyor belt 61 and also to provide lateral structure members or strengtheners for the conveyor 60 frame 71. The conveyor bed sections 74 and 75 are seen to include strengthening flanges 79 and 80 formed integrally with the beds as they are cast.

Guide roller means are provided to maintain the conveyor belt 61 in its proper position on its curved path. This roller means comprises a series of separately attached roller assemblies 81 of the type illustrated in FIG. 13 and mounted on the undersurface of the belt 61 in the manner illustrated in FIG. 12. Each of the guide roller assemblies 81 includes a right angle mounting bracket 82 with rivets or bolts 83 for fastening the bracket 82 to the belt 61. A first pulley axle 84 rotatably mounts a vertical guide roller 85 and a horizontal axle 86 rotatably mounts a horizontal guide roller 87.

As seen in FIG. 12, the guide roller assemblies 81 are riveted or bolted to the outer edge of the conveyor belt 61 with the vertical guide rollers 85 positioned to engage a curved guide plate 88. The guide plate 88 is mounted in spaced relationship to the outer curved side plate 70 on a series of horizontal spacer rods 89. Preferably, a plastic low friction long wearing guide strip 90 is provided at the top of the guide plate 88 for engaging the guide rollers 85 along the upper run of the belt 61 and a second plastic low friction guide strip 91 may be provided for engaging the guide rollers 85 when they are moving along the lower run of the conveyor belt 61. The horizontal guide rollers 87 run in generally horizontal and curved hold-down channels 92 and 93. Thus, an upper channel 92 is provided which is coextensive with the horizontal portion of the upper run of the conveyor belt 61 for facilitating the control and positioning of the upper run of the belt 61. The rolls 87 will engage either the upper flange 94 or the lower flange 95 of the upper channel 92 or of the lower channel 93. These upper and lower surfaces are preferably lined with low friction long wearing plastic strips 96 and 97. It is thus seen that the roller assemblies 81, which are closely spaced along the outer edge of the conveyor 61 as seen in FIG. 10, provide for effective lateral and vertical control of the belt 61 and that this control is obtained by a relatively simple and long wearing guiding means conveniently positioned within the conveyor 60.

It will be seen that an improved power turn conveyor has been provided having an improved, more efficient and longer wearing belt guiding system. The conveyor bed and guiding system includes standardized sections which further improve and simplify the conveyor construction and operation.

As various changes may be made in the construction and arrangements of the parts herein without departing from the spirit and scope of the invention and without sacrificing any of its advantages, it is to be understood that all matter herein is to be interpreted as illustrative and not in a limiting sense.

Having thus described my invention, I claim:

1. In a power turn conveyor having a curved endless conveyor belt mounted with an upper and a lower run on a curved belt supporting bed between tapered end rollers rotatably supported at opposite ends of the bed and with belt guide rollers mounted on the inner surface of the longer outer edge of said belt for engaging roller guiding mean on the bed, the improvement comprising:

said bed comprising a plurality of unitary sections;
said sections having lateral sides angularly aligned with each other;
the lateral sides of a plurality of identical first sections being coupled together forming a curved upper bed portion;
the lateral sides of a plurality of identical second sections being coupled together forming a corresponding curved lower bed portion;
said sections having integral downwardly depending stiffening flanges and spaced apertures for conveyor belt support rollers;
belt support rollers rotatably mounted in said apertures;
said bed sections mounting curved outwardly facing guide plates engaging the belt guide rollers on the upper and lower runs of said conveyor belt;
said belt guide rollers comprising a plurality of spaced roller guide assemblies mounted at spaced positions along said lower outer edge of said conveyor belt with each of said roller assemblies comprising a pair of rollers having their axles positioned at right angles to one another and with one axle having a generally vertical axis and the other axle having a generally horizontal axis;
said guide rollers having vertical axles being positioned to engage said guide plates; and
a pair of curved hold-down channels mounted outwardly of said guide plates with one channel being at the level of the upper run of said conveyor belt and with the other channel being at the level of the lower run of said conveyor belt and said guide rollers having horizontal axles being positioned for moving through said channels for holding the conveyor belt runs downwardly.

2. The power turn conveyor as claimed in claim 1 which further comprises an additional end roller positioned below the axis of one of said tapered end rollers for engaging a portion of the lower run of said conveyor belt.

3. The power conveyor as claimed in claim 1 which further comprises anti-friction roller engaging members positioned on the guide roller engaging surfaces of said guide plates and said channels.

* * * * *